United States Patent [19]

Kullmann

[11] 4,278,906
[45] Jul. 14, 1981

[54] COOLING ARRANGEMENT FOR THE ROTOR OF AN ELECTRIC MACHINE

[75] Inventor: Dieter Kullmann, Langenzenn, Fed. Rep. of Germany

[73] Assignee: Siemens Aktiengesellschaft, Berlin and Munich, Fed. Rep. of Germany

[21] Appl. No.: 55,513

[22] Filed: Jul. 9, 1979

[30] Foreign Application Priority Data

Jul. 13, 1978 [DE] Fed. Rep. of Germany ....... 2830852

[51] Int. Cl.³ .............................................. H02K 7/14
[52] U.S. Cl. ...................................... 310/52; 310/261
[58] Field of Search ....................... 310/52, 54, 53, 58, 310/61, 64, 65, 261

[56] References Cited

U.S. PATENT DOCUMENTS

| | | | |
|---|---|---|---|
| 2,033,058 | 3/1936 | Williamson | 310/64 |
| 3,049,634 | 8/1962 | Horsley | 310/54 |
| 3,517,231 | 6/1970 | Massar | 310/52 |
| 3,809,933 | 5/1974 | Sugawara | 310/40 |
| 4,013,908 | 3/1977 | Weghaupt | 310/61 |

Primary Examiner—R. Skudy
Attorney, Agent, or Firm—Kenyon & Kenyon

[57] ABSTRACT

A cooling arrangement for the rotor of an electric machine having a superconducting field winding includes a co-rotating mixing chamber, a coolant distribution system arranged at the outer circumference of the winding, and radial cooling canals passing through the winding as well as coolant connecting lines outside the winding, in which the coolant flows through the cooling canals due to self-pumping. The coolant connecting lines have thermally insulating end sections which protrude further into the coolant distribution system from the rotor axis than the inlet openings of the cooling canals, so that a coolant flow direction from the outside-in, through the cooling canals, is fixed in an advantageous manner.

9 Claims, 2 Drawing Figures

COOLING ARRANGEMENT FOR THE ROTOR OF AN ELECTRIC MACHINE

BACKGROUND OF THE INVENTION

1. Field of the Invention

This invention relates to a cooling arrangement for the rotor of an electric machine having a superconducting field winding and a co-rotating mixing chamber containing a phase mixture of a coolant supplied from the outside. A coolant distribution system is arranged at the outer circumference of the field winding, and there are cooling canals running through the parts of the field winding between the coolant distribution system and the mixing chamber, as well as coolant connecting lines outside the field winding in which coolant flows by self-pumping through the cooling canals during operation.

2. Description of the Prior Art

A cooling arrangement for the superconducting field winding of a turbo-generator, in which a coolant flow through the field winding takes place under operating conditions due to a self-pumping effect, is described, for instance, in the dissertation of A. Bejan: "Improved Thermal Design of the Cryogenic Cooling System for a Superconducting Synchronous Generator," Ph.D. Thesis, Massachusetts Institute of Technology (USA), December 1974, at pages 148 to 159. The coolant required for cooling the field winding is conducted centrally, in partly liquid condition and at a pressure reduced to below $10^5$ Pa, through the rotor shaft by way of a rotating coupler from a refrigeration machine, through a Joule-Thomson valve, and is introduced into a mixing chamber provided there near the axis. A two-phase mixture of liquid and gaseous coolant is then contained in the mixing chamber. Due to the centrifugal forces acting on this two-phase mixture during rotation, the coolant vapor accumulates in the region of the mixing chamber near the axis, and the coolant liquid in the regions away from the axis. A coolant stream with liquid coolant is pumped, from the mixing chamber, via radial canals, into a coolant bath in which the superconducting field winding is arranged, and the heat dissipated by the winding is given off to the coolant. The heat absorbed in the process causes the temperature to rise and the coolant, which is returned to the mixing chamber via further radial canals, to be partly evaporated. In this known machine, a coolant flow through the field winding, which is substantially parallel to the rotor axis, takes place.

The pumping action necessary for developing the flow of the coolant is brought about by a self-pumping effect based on density differences. For, due to centrifugal forces, the coolant is accelerated outward in the radial lines, being isentropically compressed, and is thus pumped into the bath cooling the field winding. In addition, it is warmed up there due by dissipation heat or by heat transferred from the outside, and its density is decreased accordingly. This produces a hydrostatic pressure difference between the radial feed and return lines. Thus, a pressure gradient is developed along the winding between the feed point and the outlet of the coolant. This pressure gradient leads to a convection flow and causes the coolant to be returned via the discharge lines into the mixing chamber near the axis (c.f., "Cryogenics" July 1977, pages 429 to 433, and Germany Offenlegungsschrift 25 30 100). The resulting closed coolant circuit through the field winding is also called a thermo-syphon loop.

In such a thermo-syphon loop, a preferred flow direction does not occur by itself. This leads to difficulties, particularly if a substantially radial flow is to be provided through the field winding of the rotor of a machine. For, particularly during the cooling-down phase of such a field winding, coolant can flow into the cooling canals of the winding directly from the mixing chamber and thus flow through the winding from the inside out. Since the outer parts of the field winding are warmer than the inner parts, but the density of the coolant decreases accordingly, the warmed-up coolant attempts to flow back in to the cooling canals. The danger thus exists that the outer parts of the field winding may not be cooled sufficiently because of instabilities developing within the cooling canals. The field winding can then only be cooled down very slowly and, therefore, uneconomically.

It is therefore an object of the invention to prevent such instabilities in a cooling system which operates by self-pumping in an electric machine having a superconducting field winding through which cooling canals pass, substantially radially, with respect to the rotor axis. In particular, it is an object of the invention to provide a cooling arrangement for a field winding having such cooling canals in which coolant flow from the outside in is always ensured.

SUMMARY OF THE INVENTION

This problem is solved, for a cooling arrangement of the type mentioned above, by providing at least some of the coolant connecting lines connected to the coolant distribution system with an end section which protrudes into the coolant distribution system and is thermally insulated from the coolant in the system by means of a shielding device. At least one coolant outlet opening is provided in each end section at a predetermined distance from the rotor axis which is larger than the distance to the corresponding coolant inlet openings of the cooling canals connected to the coolant distribution system through the winding parts of the field winding.

This cooling arrangement design has the particular advantage that the heat introduced into the coolant distribution system heats the coolant outside the end sections of the coolant connecting lines and outside their shielding devices faster than the coolant which is inside the lines. Therefore, the warmer coolant always flows in the direction of the outer openings of the cooling canals lying on the shorter radius and is replaced by cold coolant from the coolant connecting lines. Thus, an outside-in flow of coolant, in the cooling canals of the field winding, is brought about from the start. This flow direction coincides with the direction of the convection flow which would naturally occur due to dissipation heat produced in the superconductors.

In order to prevent action by heat from the outside on the cold coolant transported into the coolant distribution system through the coolant connecting lines immediately at the outlet openings of the coolant connecting lines, the end section of the coolant connecting line is advantageously provided with lateral outlet openings. The coolant leaving these openings is thus given a flow component in the direction of the coolant distribution system. When the released coolant is warmed up, it is practically no longer possible for it to flow back through these outlet openings into the coolant connecting lines.

According to a further advantageous feature of the cooling arrangement according to the invention, the shielding device for thermal shielding of the end section of the coolant connecting line contains a cup-shaped shielding element which opens toward the inside and the hollow cylindrical side portion of which surrounds the end section by a predetermined spacing. By means of the shielding element, the preferred direction of flow in the thermo-syphon loops is enhanced, since heating of the cold coolant transported into the coolant distribution system can occur only when the coolant has arrived in the coolant distribution system and flows toward the inlet openings of the cooling canals in the winding parts of the field winding.

DETAILED DESCRIPTION OF THE INVENTION

Figure 1:
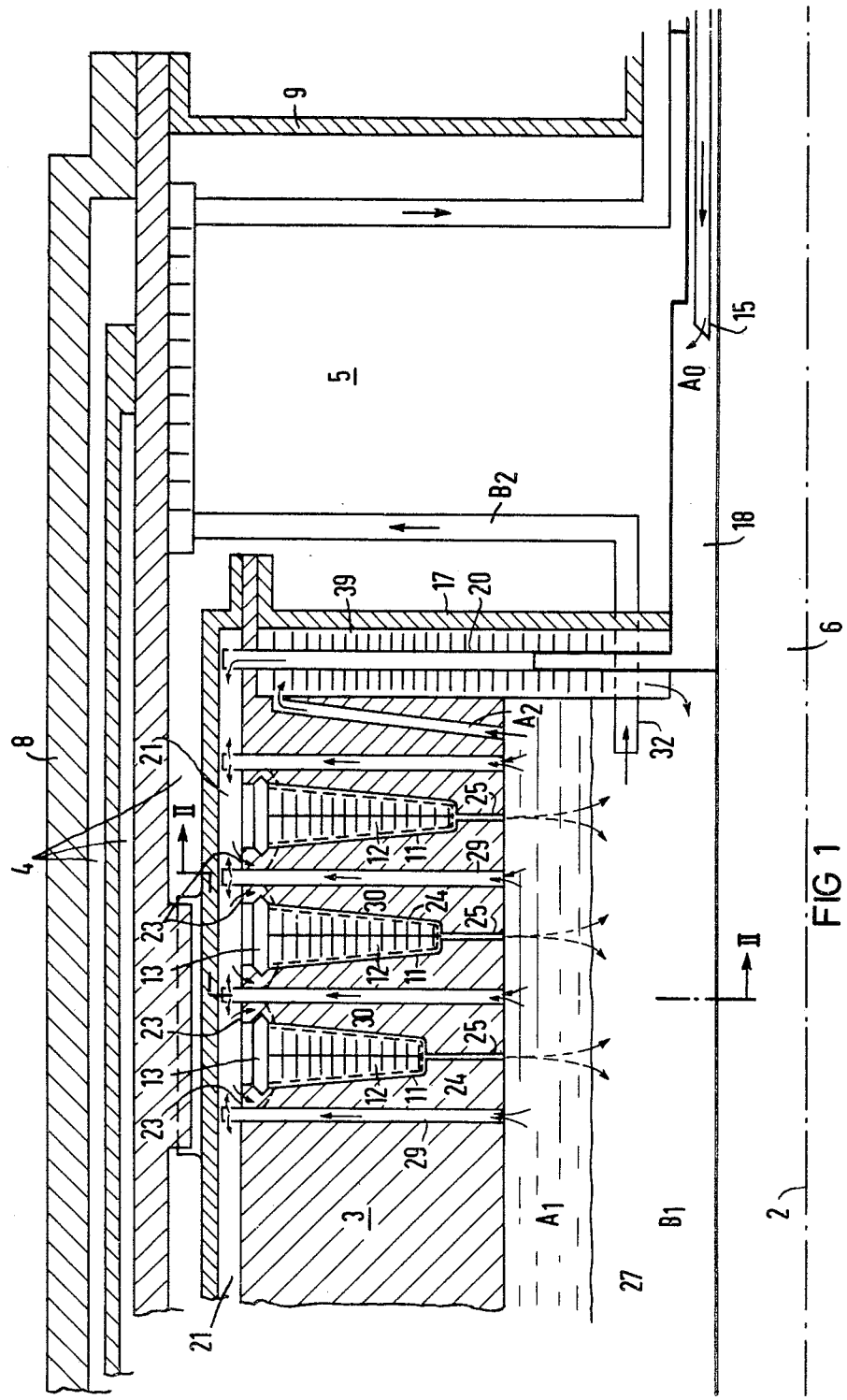
FIG. 1 is a longitudinal view, in cross-section, of part of a rotor having a cooling arrangement in accordance with the invention.

A path for coolant flow through a field winding in the rotor of an electric machine, particularly a turbo-generator, is seen in FIG. 1. In the longitudinal cross-section of the figure, only a part of the rotor, located on the nondriven side having a cooling arrangement according to the invention is illustrated. Rotor parts not detailed in the figure may correspond, for instance, to parts of a machine which is described in U.S. Pat. No. 4,060,743.

The rotating parts to be cooled of a rotor body 3, supported concentrically about an axis 2 of the machine, are surrounded by evacuated spaces 4, 5 and 6. These spaces are located inside a hollow cylindrical housing part 8 and a disc-shaped housing part 9 at the end face of a corresponding, co-rotating vacuum housing which is at or above room temperature. Disc-shaped end piece 9 of the vacuum housing is, at the same time, part of a terminal head, not detailed further, of the rotor. Rotor body 3 has outward facing slots 11, into which the turns of field winding 12 are placed. These parts of the field winding are held in slots 11 by wedges 13. The conductors of winding 12 are made of superconducting material and helium is provided as the coolant. The flow directions of the individual coolant streams, which adjust themselves in the operating condition of the machine, are illustrated by arrows.

A coolant $A_o$, preferably normal-boiling helium at a pressure of about $1.2 \times 10^5$ Pa and a temperature of 4.4 K. is taken from a coolant supply device not shown in the drawing and is fed in at a helium coupler via stationary feed line 15 which protrudes into the rotor in the vicinity of the axis to a co-rotating antechamber 18 located at end face 17 of rotor body 3. At least one coolant feed line 20 is connected to this antechamber and extends radially from it, with respect to rotor axis 2. The coolant is conducted through feed line 20 into a coolant distribution system 21 arranged at the outer circumference of field winding 12. From this coolant distribution system, which consists of coolant lines which are connected to each other in network fashion, extending parallel to the axis and in the circumferential direction of the rotor, the coolant passes through inlet openings 23, around the outer edges of slots 11, into cooling canals 24, which extend, substantially radially with respect to rotor axis 2, through the parts of field winding 12 arranged in slots 11. The coolant that has arrived at the bottom of the slot is then conducted, via radial coolant pipes 25, into a mixing chamber 27 arranged in the interior of the rotor.

Under operating conditions, a two-phase mixture of liquid coolant $A_1$ and gaseous coolant $B_1$ is contained in the mixing chamber 27 of the machine. Upon rotation, the phases are separated, under the influence of centrifugal force, so that the heavier liquid coolant $A_1$ settles concentrically around the gaseous coolant $B_1$.

For cooling superconducting field winding 12, a closed circuit is provided, in which a self-pumping effect is utilized. For this purpose, radially disposed coolant connecting lines 29 disposed between the coolant distribution system 21 at the outer circumference of field winding 12 and the central mixing chamber 27 are provided, which extend in the tooth-like intermediate bodies 30 located between adjacent slots 11 of rotor body 3. During rotation, cold liquid coolant $A_1$ is transported from mixing chamber 27 via these connecting lines 29 into coolant distribution system 21. From there, it then passes into connected canals 24 within superconducting winding 12, since, because of heat inflow from the outside, the coolant is warmed up in the coolant lines of the coolant distribution system 21. The coolant is also warmed up by the heat dissipated by the winding parts of field winding 12. The resulting reduction of coolant density causes a decrease of the hydrostatic pressure in the coolant in distribution system 21, relative to the hydrostatic pressure of the cold coolant in connecting lines 29. The coolant therefore returns, passing inward radially into mixing 27 chamber via canals 24 and pipes 25, and gives off the absorbed heat by evaporation. The closed cooling circuits through the field winding obtained in such a cooling system therefore represent so-called thermosyphon loops (c.f., German Offenlegungsschrift No. 25 30 100).

The evaporated quantity of coolant which flows into the mixing chamber under operating conditions is conducted to the outside via an exhaust gas tube 32. Here, too, a self-pumping effect is utilized for suctioning of the gaseous coolant $B_2$. A corresponding suction effect is described, for instance, in the journal "Cryogenics," July 1977, at pages 429 to 432. The discharged quantities of coolant $B_2$ are replaced by liquid coolant $A_o$ supplied from the outside.

Due to the self-pumping effect utilized, in the cooling arrangement according to the invention, for syphoning off the coolant $B_2$, an under-pressure, which is below $10^5$ Pa, advantageously adjusts itself in the exhaust gas tube 32. This under-pressure also prevails in mixing chamber 27 and leads to a lowering of the temperature there, when certain steps are taken in feeding the helium $A_o$ in from the outside. In general, the helium is fed in at a pressure which is already reduced and is at a correspondingly reduced temperature, by means of a Joule-Thomson valve located in the helium feed system. According to the illustrative embodiment of FIG. 1, the helium is fed into antechamber 18 at a pressure of at least $10^5$ Pa; this antechamber, however, is separated from mixing chamber 27 pressure-wise. From antechamber 18, the helium flows, radially outward, via feed line 20, into coolant distribution system 21. Feed line 20 is designed here as part of heat exchanger 39, so that the heat of compression produced by the increase in pressure is transferred to colder helium $A_2$ taken from the mixing chamber. Thereby, the temperature rise of the helium being fed in, which would otherwise take place due to adiabatic compression, is largely avoided. In this way, the underpressure in the mixing chamber is also maintained without Joule-Thomson expansion.

Under operating conditions, a fixed direction of coolant flow through the winding must be ensured in the thermo-syphon loops. For, if the coolant does not flow through the winding from the outside in, losses which come about in the superconductors in the event of transients, can lead to at least a temporary blockage of flow through winding 12, producing instabilities which jeopardize the rapid removal of heat losses from the winding. For, if the colder coolant first enters cooling canals 24 of field winding 12 from mixing chamber 27 via the pipes 25, i.e., if the coolant were to flow through these cooling canals from the inside out, then it will have been warmed up ahead of time in the cooling canals, should there be losses occurring in the winding. However, since the warmer coolant tends to flow back toward rotor axis 2, a stoppage of the coolant circulation in the winding can result. Sufficient cooling of the winding parts is then no longer assured. The cooling arrangement according to the invention insures that initially cold coolant $A_1$, taken from mixing chamber 27, always passes first into the lines of coolant distribution system 21 and then flows from there radially inward, through the field winding. Structures for doing this, according to the invention, relate to the ends of coolant connecting lines 29 away from the axis, as shown in detail in FIG. 2.

Figure 2:
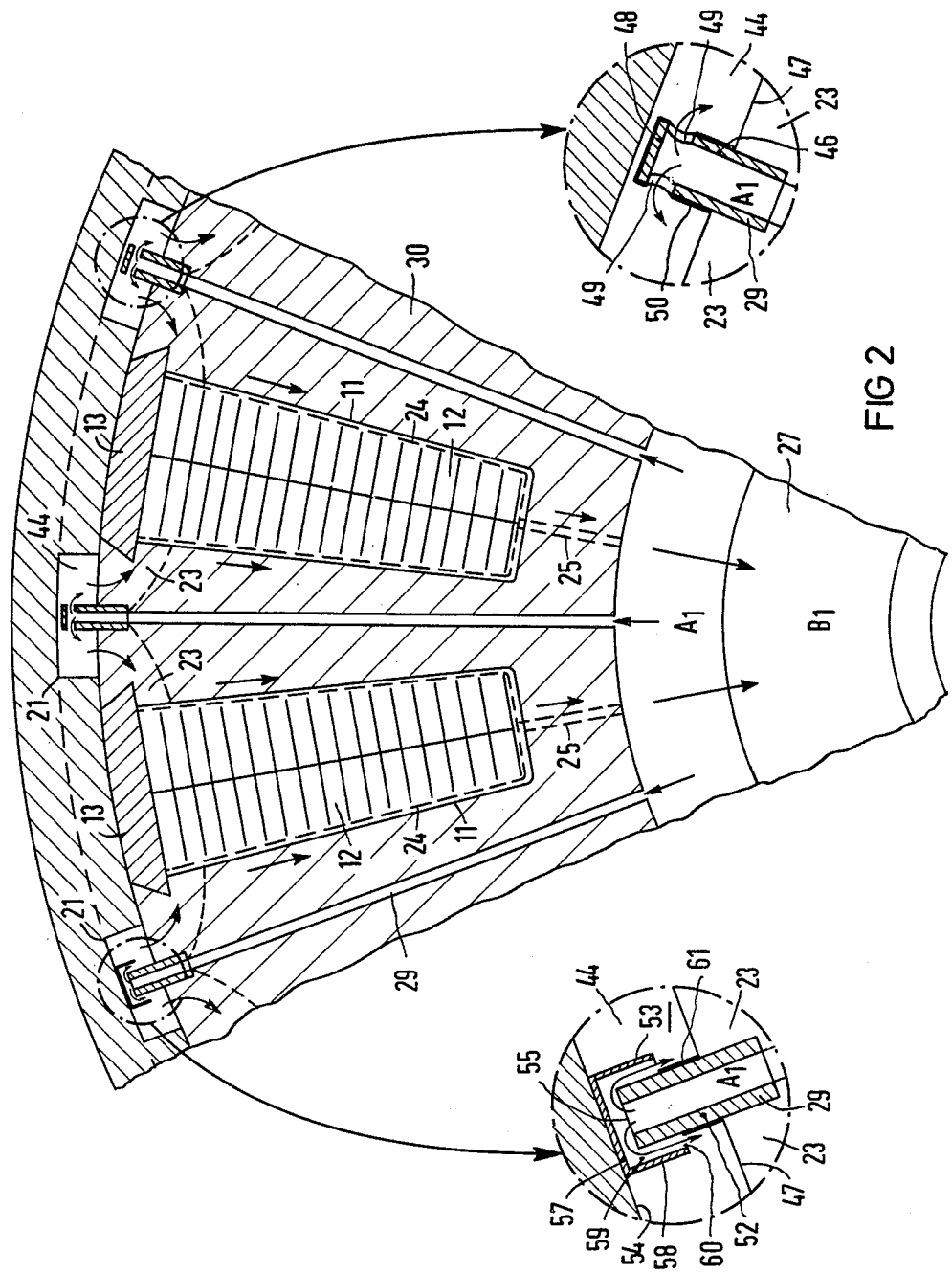
FIG. 2 is a view, in cross-section, through the rotor of FIG. 1, taken along the lines II—II.

FIG. 2 shows a cross section through the rotor of FIG. 1, in which parts identical with those in FIG. 1 are given the same reference symbols. The section is taken along the radial lines II—II in FIG. 1 and so as to show radial coolant connecting lines 29. Cold liquid coolant $A_1$ is to be fed first, in a thermo-syphon loop from the mixing chamber 27 near the axis, via these coolant connecting lines 29 to coolant distribution system 21, which is disposed at the outer circumference of field winding 12, and which contains several distributor canals 44 extending parallel to the axis of the machine. Then, the coolant is to enter, through outer inlet openings 23, into cooling canals 24 in slots 11 and to flow inward in canals 24 along field winding 12 toward the bottom of slots 11 being returned from slots 11 to mixing chamber 27 via pipes 25. To insure that this flow direction occurs in the thermo-syphon loops, coolant connecting lines 29 have outer end sections 46 which extend radially a predetermined distance outward, beyond bottoms 47 of cooling canals 44 near the axis. In one embodiment, these end sections 46 are closed off at their outer ends 48, but have lateral outlet openings 49 below the closure so produced, through which coolant $A_1$ can enter canals 22. End sections 46 are, in addition, advantageously surrounded by a jacket 50 of thermally, highly insulating material in order to thermally separate the newly arriving helium $A_1$ from the helium already in canals 44. The jacket thus constitutes a thermal shielding device. Optionally, the entire end section 46 can be made of a suitable insulating material. As a result of these measures, the cold coolant which has already issued from openings 49 is warmed up by heat emanating from the warmer parts of the rotor, and therefore flows radially inward in the direction of inlet openings 23 at slots 11 instead of inside the connecting lines 29.

Another method for fixing this preferred direction of flow in the thermo-syphon loops shown in FIG. 2 consists in having the extended end sections 52 of coolant connecting lines 29 lead into cup-shaped thermal shielding elements 53 which are made of a thermally poorly conducting material. These elements are fastened to inside wall 54 of canal 44, opposite extended end sections 52. The cold helium $A_1$ emerges from the openings 55, in the ends of end sections 52, inside cup-shaped elements 53. A cup-shaped element 53 includes a disc-like part 57 which faces opening 55 of end section 52 and extends beyond the outer circumference of opening 55 to connect with hollow cylinder 58, preferably of the same material. Hollow cylinder 58 extends inward for a given distance and encloses the outer part of end section 52. Cold coolant $A_1$ emerging from opening 55 thus first arrives in an annular space 59, which is thermally insulated from the outside, and is then redirected into an inward flow without being able to absorb radiation heat coming-in from the outside. After the coolant has left the lower rim of cup-shaped shielding element 53, it is distributed in canals 44 of coolant distribution system 21 and replaces the warmed-up helium which flows from there into the canals 24. The annular opening 60 of this lower rim then represents the outlet openings proper for the cold coolant. At least up to the height of this lower edge of shielding element 53, the end section 52 is surrounded by a jacket 61 of thermally highly insulating material in order to prevent the cold coolant $A_1$ flowing in the end section from being warmed up by warmer coolant located in canals 44. In this illustrative embodiment, the thermal shielding device therefore consists of shielding element 53 and jacket 61.

Hollow cylindrical part 58 of shielding element 53 can optionally be dispensed with if disc-shaped part 57 is made large enough and end section 52 is completely enclosed by a jacket of thermally insulating material or consists of this material.

In the alternative, cup-shaped shielding element 53 can also be fastened to end section 52. In this case, disc-shaped part 57 lies directly against the outer end of end section 52 and lateral outlet openings for the coolant are provided, as in end section 46.

In one illustrative embodiment of a cooling arrangement according to the invention, the radial distance of outlet openings 49 or lower rim 60 from the rotor axis is 40.5 cm. It is 0.5 cm larger than the corresponding distance of bottom surface 47 of coolant distributor lines 44 and, therefore, inlet openings 23, from the axis. The temperature rise at the outer circumference of winding 12 is to be, for instance, 0.5 K. as compared to the temperature of the helium in end sections 46 or 52, in the event of a sudden heating process, i.e., if losses are produced. Then, due to density differences along the distance between outlet openings 49 or 60 and inlet openings 23, a pumping pressure is produced which aids the flow. Given cooling canals each of which has a length of 16 cm, a cross-sectional area of 0.05 cm$^2$, and a hydraulic diameter of 0.167 cm, heat removal of about 0.65 W per cooling canal is obtained. A 2000-MVA generator may contain about 15,000 turn-cooling canals. For the given temperature rise of 0.5 K., the total thermal power that can be removed is, then, about 10 kW. A loss penetrating into the coolant distribution system from the outside, for instance, in the event of pulse short circuits or hunting phenomena, is of this order of magnitude.

What is claimed is:

1. In an arrangement for cooling the rotor of an electric machine having a superconducting field winding which is cooled by coolant flow from a co-rotating mixing chamber located near the axis of the rotor, through coolant connecting lines outside the winding parts, a coolant distribution system disposed at the outer circumference of the field winding, and cooling canals running through the winding parts of the field winding between the coolant distribution system and the mixing chamber so that, during operation, coolant flows through the cooling canals due to a self-pumping effect, the improvement comprising:

at least some of the coolant connecting lines having end sections projecting into the coolant distribution system, each end section being thermally insulated from the coolant in the distribution system by a shielding device and having at least one coolant outlet opening located a predetermined distance from the rotor axis which is greater than the distance of inlet openings connecting the cooling canals to the coolant distribution system, as measured to the rotor axis, through the winding parts of the field winding.

2. In a cooling arrangement according to claim 1, the further improvement comprising the end sections of the coolant connecting lines having lateral outlet openings.

3. In a cooling arrangement according to claim 1, the further improvement in which the shielding device comprising a jacket which at least partially encloses the end section.

4. In a cooling arrangement according to claim 3, the further improvement in which the shielding device comprises a shielding element which is fastened to the end section.

5. In a cooling arrangement according to claim 3, the further improvement comprising the shielding device having a shielding element which is arranged at the predetermined distance from the end section.

6. In a cooling arrangement according to claim 5, the further improvement comprising the shielding element having a flat part, the outer rim of which extends laterally beyond the end section.

7. In a cooling arrangement according to claim 5, the further improvement comprising a cup-shaped shielding element, open toward the end section, and placed so that the end of the hollow cylindrical lateral part surrounds the end section at the predetermined distance.

8. In a cooling arrangement according to one of claims 1 to 7, the further improvement comprising the end section being, at the same time, part of the shielding device.

9. In a cooling arrangement according to one of claims 1 to 5, the further improvement comprising the shielding device being made of thermally highly insulating material.

* * * * *